(12) United States Patent
Sole Lopez et al.

(10) Patent No.: US 8,953,344 B2
(45) Date of Patent: Feb. 10, 2015

(54) POWER CONVERTER CONTROL METHOD ASSOCIATED TO A GENERATOR

(75) Inventors: David Sole Lopez, Navarra (ES); Ainhoa Carcar Mayor, Navarra (ES); Josu Elorriaga Llanos, Navarra (ES); Eneko Olea Oregi, Navarra (ES)

(73) Assignee: Ingeteam Power Technology, S.A., Zamudio (ES)

( * ) Notice: Subject to any disclaimer, the term of this patent is extended or adjusted under 35 U.S.C. 154(b) by 527 days.

(21) Appl. No.: 12/957,567

(22) Filed: Dec. 1, 2010

(65) Prior Publication Data
US 2012/0119722 A1    May 17, 2012

(30) Foreign Application Priority Data
Nov. 11, 2010   (EP) .................................. 10382294

(51) Int. Cl.
*H02M 5/40* (2006.01)
*H02J 3/24* (2006.01)
(Continued)

(52) U.S. Cl.
CPC ... *H02J 3/24* (2013.01); *F03D 9/00* (2013.01); *H02P 3/22* (2013.01); *H02P 9/00* (2013.01); *H02P 9/006* (2013.01)
USPC .......................................................... 363/34

(58) Field of Classification Search
CPC ....................................................... F03D 9/00
USPC ............... 363/34, 35, 128, 132, 55, 108, 109, 363/124, 45; 323/37, 39, 40, 41, 48
See application file for complete search history.

(56) References Cited

U.S. PATENT DOCUMENTS

| 8,025,115 B2 * | 9/2011 | King et al. ............... 180/65.275 |
| 2003/0151259 A1 | 8/2003 | Feddersen et al. ............. 290/44 |

(Continued)

FOREIGN PATENT DOCUMENTS

| EP | 1 499 009 | 1/2005 |
| EP | 1 863 162 A2 | 12/2007 |

(Continued)

OTHER PUBLICATIONS

N. Mohan et al., "Power Electronics: Converters, Applications and Design", John Wiley & Sons, Inc., p. 332-333 (1989).

(Continued)

*Primary Examiner* — Jessica Han
*Assistant Examiner* — Trinh Dang
(74) *Attorney, Agent, or Firm* — Sughrue Mion, PLLC

(57) ABSTRACT

Optimizes the operation and control of electric generators against events produced in the power grid, such as voltage dips or overvoltages, comprising the following steps: detecting that the DC bus voltage level ($V_{bus}$) (301) exceeds the maximum operating limit established in normal conditions; enabling activation permission of the chopper (201); activating the different operating states (304) of the chopper (201) according to the DC bus voltage level ($V_{bus}$) (301) and to the current entering the DC bus ($I_{in.bus}$) from the generator; detecting that the DC bus voltage level ($V_{bus}$) (301) is within the normal operating range; enabling deactivation permission of the chopper (201); deactivating the different operating states (304) of the chopper (201) according to the DC bus voltage level ($V_{bus}$) (301) and to the current entering the DC bus ($I_{in.bus}$) from the generator.

12 Claims, 3 Drawing Sheets

(51) Int. Cl.
*F03D 9/00* (2006.01)
*H02P 3/22* (2006.01)
*H02P 9/00* (2006.01)

(56) References Cited

U.S. PATENT DOCUMENTS

| | | | | |
|---|---|---|---|---|
| 2004/0217594 A1 | 11/2004 | Feddersen et al. | | 290/44 |
| 2004/0217595 A1 | 11/2004 | Feddersen et al. | | 290/44 |
| 2004/0217596 A1 | 11/2004 | Feddersen et al. | | 290/44 |
| 2004/0222642 A1* | 11/2004 | Siebenthaler et al. | | 290/44 |
| 2007/0103947 A1* | 5/2007 | Taguchi et al. | | 363/45 |
| 2007/0142985 A1* | 6/2007 | Kumar | | 701/22 |
| 2007/0273155 A1 | 11/2007 | Barton et al. | | 290/44 |
| 2008/0284369 A1* | 11/2008 | Jones et al. | | 318/722 |
| 2008/0304189 A1* | 12/2008 | Tang et al. | | 361/33 |
| 2009/0079193 A1 | 3/2009 | Nielsen et al. | | 290/44 |
| 2009/0206606 A1 | 8/2009 | Jorgensen et al. | | |
| 2010/0106343 A1* | 4/2010 | Donnelly et al. | | 700/295 |

FOREIGN PATENT DOCUMENTS

| | | |
|---|---|---|
| JP | 7-194196 | 7/1995 |
| JP | 2005-269843 A | 9/2005 |
| WO | WO 03/065567 | 8/2003 |
| WO | WO 2004/030199 | 4/2004 |
| WO | 2006/069569 A1 | 7/2006 |
| WO | WO 2008/121868 | 10/2008 |
| WO | WO 2010/045964 | 4/2010 |

OTHER PUBLICATIONS

Extended European Search Report issued in European Application No. 10382294.6 dated Sep. 11, 2011.

* cited by examiner

POWER CONVERTER CONTROL METHOD ASSOCIATED TO A GENERATOR

OBJECT OF THE INVENTION

The present invention relates to a method for operating a power converter associated to a generator, and more specifically to wind turbine generators.

BACKGROUND OF THE INVENTION

Currently, wind energy has been consolidated as the firmest alternative to conventional energy sources. This consolidation is due to an improvement in the technology used, which has made it possible to enjoy an enormous growth in the number of wind generators and wind farms installed. However, this growth could be slowed down by integration problems in the power grid, due to the high degree of wind energy penetration therein.

One of the main problems of wind generators is linked to its performance towards events produced in the power grid, such as voltage dips. It is for this reason that nowadays most countries have been forced to regulate the performance of wind generators against said voltage dips, and these regulations are becoming stricter and stricter.

A large number of the wind turbines installed use Doubly Fed Induction Generators (DFIG) and full converters (FC). Both technologies are based on an electric generator connected to the grid through a back-to-back or AC/DC/AC (alterating current-direct current-alterating current) converter. In the case of DFIG systems, the converter is connected between the generator rotor and the power grid, while in the case of FC systems it is connected between the generator stator and the power grid.

Said AC/DC/AC converter basically comprises a generator-side converter and a grid-side converter, both connected by means of a DC bus.

One of the main drawbacks of said generators is their performance when faced with grid events, particularly voltage dips. In the case of DFIG systems, said voltage dips cause the appearance of elevated transient currents in the generator-side converter, which can cause serious damage to said converter, even causing the destruction thereof. In the case of FC systems, the appearance of voltage dips limits the discharge of power to the grid.

One of the most used conventional solutions to resolve this drawback is to include a chopper in the DC bus. Operating a load in a controlled manner to discharge power from a continuous bus of a power converter has been done for decades, for example in speed variators. FIG. 1 represents this solution, which forms part of the state of the art (Source: Power electronics: converters, applications, and design, Ned Mohan, Ed. John Wiley & Sons, 1989, Page 421, FIGS. 14-20 (a)).

One example of an operating method of a chopper is disclosed in JP7194196. Said chopper includes several resistive branches which are activated and deactivated according to the voltage level in the DC bus.

Other examples of operating a chopper are found in American patent U.S. Pat. No. 7,015,595, which discloses a chopper method and an operating system. Likewise, patent application US2009079193A1 discloses a control method for a chopper with two branches.

Most of the controls associated to a chopper implement a hysteresis control. Hysteresis control is a simple control which activates or deactivates the chopper according to two pre-set voltage levels of the DC bus of the power converter. In the event that the converter is used in a connection application to the grid in which a quick response is required against grid transients, this control does not permit sufficiently fast dynamics, so that the bus voltage can exit the range of normal operating conditions.

Another solution proposed by the state of the art is to control the chopper by means of a PWM modulation (Pulse-Width Modulation). This modulation maintains the voltage level of the bus at the desired level, but requires a more complicated and expensive hardware control than the solution proposed by this invention.

DESCRIPTION OF THE INVENTION

The invention proposes a control method that resolves the previously mentioned drawbacks by providing an electric generation system which optimises the operation and control of electric generators, preferably wind turbine generators, against events produced in the power grid, such as voltage dips or overvoltages.

The method of the present invention is intended to control a chopper located in the DC bus of the power converter. Therefore, not only does it control the DC bus voltage (as in hysteresis controls from the state of the art), but also the current entering the DC bus from the generator or from the grid. In this manner, it equips the system with greater observability, which makes it possible to predict the sudden voltage variation in the DC bus in the event that a transient is produced in the grid or in the generator.

Consequently, the response time of the chopper control is reduced, which permits the voltage of the DC bus to be maintained within the normal operating range at all times, thus preventing the shutdown or disconnection of the system.

For example, when a voltage dip occurs in the grid in a DFIG-type system, a current transient is produced in the generator rotor which, in turn, generates a bus overvoltage. The fact of watching the voltage entering the DC bus from the generator enables the prediction of the variation that the DC bus voltage will undergo, so that the chopper is activated without waiting for the DC bus voltage to exceed a specific threshold. Likewise, if the current entering the DC bus decreases, the control method permits the deactivation of the chopper without waiting for the DC bus voltage to drop below a specific threshold.

With this method, a performance is achieved similar to that of other systems which feature more complete hardware and which use control methods based on PWM modulation techniques.

The chopper system control method comprises the following steps:
  detecting that the DC bus voltage exceeds the maximum operating limit established in normal conditions,
  enabling chopper activation permission
  activating the different operating states of the chopper according to the DC bus voltage level and of the current entering the DC bus from the generator or from the grid,
  detecting that the DC bus voltage level is within the normal operating range
  enabling chopper deactivation permission
  deactivating the different operating states of the chopper according to the DC bus voltage level and of the current entering the DC bus from the generator or from the grid.

The current entering the DC bus from the generator or from the grid is produced from one of the following values:
  the current measured in the generator
  the current measured in the grid-side converter
  the current measured in the generator-side converter, and
  the current measured in the DC bus.

Normal conditions are understood as those wherein the DC bus voltage takes values within the operating range established by the general power converter controller.

In a preferred embodiment of the invention, the chopper comprises several branches. Based on the level of current measured, it is determined if the deactivation of at least one of the chopper branches can cause a dangerous overvoltage for the correct operation of the DC bus.

According to an example of the invention, based on the level of current measured, it is determined if the connection of one of the chopper branches can make the DC bus voltage decrease below the minimum threshold necessary to maintain control (minimum operating voltage). The minimum operating voltage must be such that it operates within the safety limits, so both the grid voltage and that imposed by the generator must be taken into account. This voltage, whether it is that of the rotor in doubly fed topologies or that of the stator in full converter topologies, is in turn imposed by the rotational velocity.

In a preferred embodiment, the activation of the chopper is determined according to the DC bus voltage level and/or the level of current entering the DC bus.

According to another preferred embodiment, the chopper system is controlled through a dependent or independent controller of the power converter controller.

DESCRIPTION OF THE DRAWINGS

In order to complement the description being made and with the purpose of helping towards a better understanding of the characteristics of the invention, in accordance with a preferred example of practical embodiment thereof, a set of drawings is attached as an integral part of said description, wherein the following, in an illustrative and non-limiting character, has been represented.

PREFERRED EMBODIMENT OF THE INVENTION

A preferred embodiment of the invention is described below, bearing in mind the previously mentioned figures.

Figure 1:
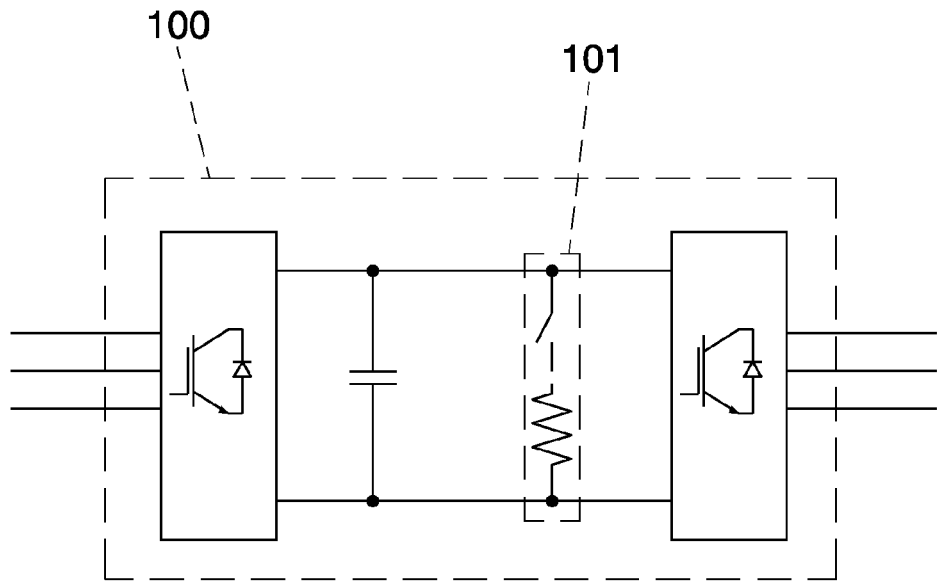
FIG. 1.—Shows a general representation from the state of the art of a chopper.

FIG. 1 represents a chopper (101) inside the power converter (100), which forms part of the state of the art.

Figure 2:
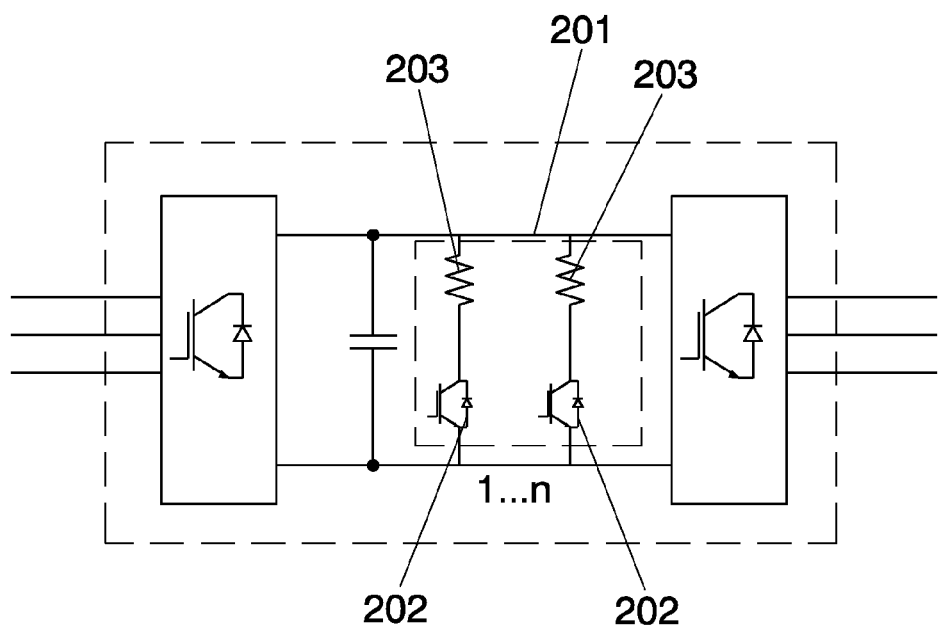
FIG. 2.—Shows a general system from the state of the art of a chopper with several branches.

On the other hand, a chopper system (201) made up of several branches (1 . . . n) can be observed in FIG. 2. Each one of the branches (1 . . . n) in turn comprises at least one switching element (202) in series with at least one resistive element (203). Said FIG. 2 shows that the switching element (202) is an IGBT transistor with an anti-parallel diode. Likewise, the resistive element (203) can be a resistor, or a resistor with a parallel diode.

Figure 3:
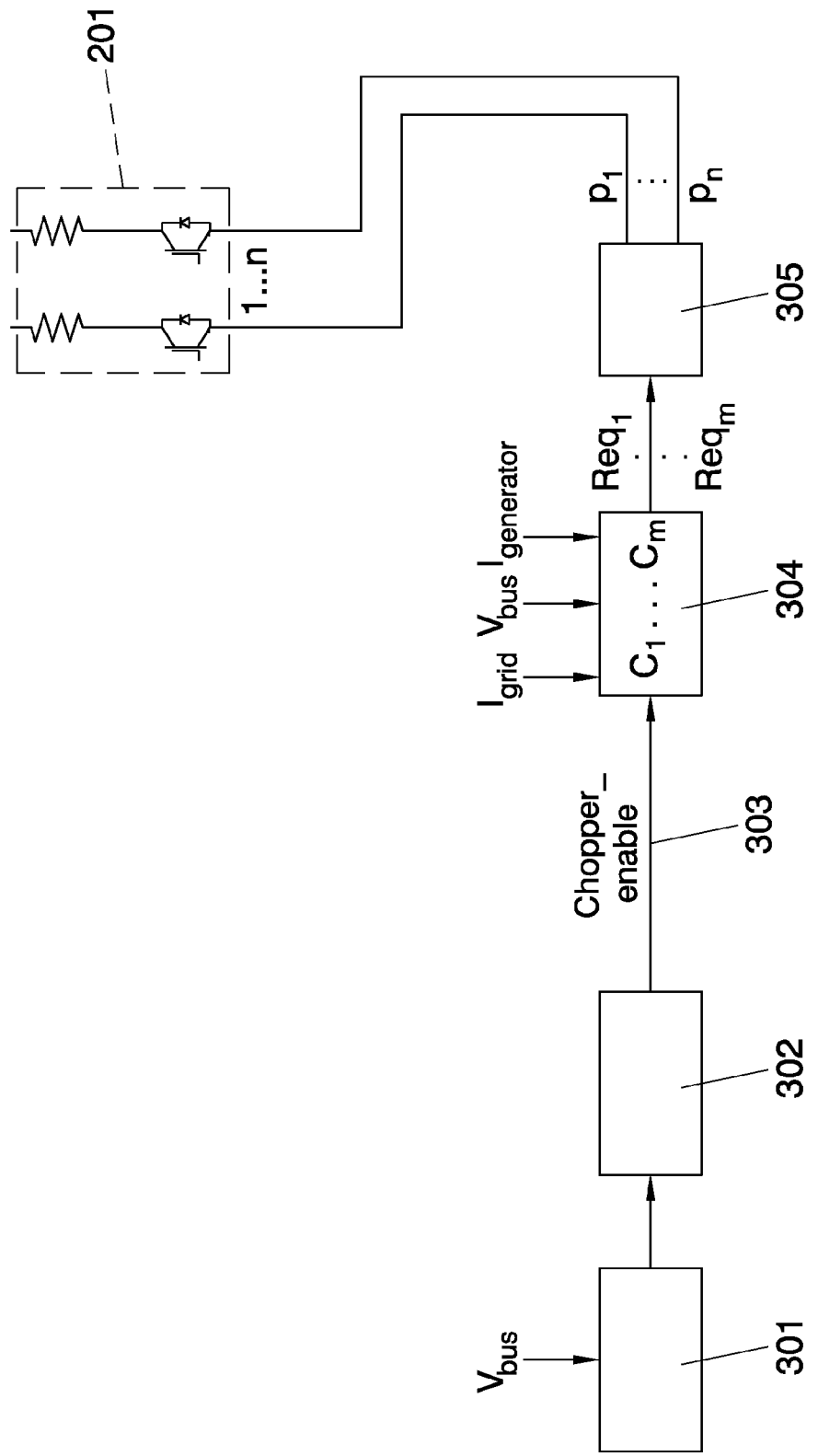
FIG. 3.—Shows a control diagram according to a preferred embodiment of the invention.

FIG. 3 represents the general control diagram of the chopper (201) according to a preferred embodiment of the invention, which comprises the following steps from the reading of the DC bus voltage ($V_{bus}$) (301):

if the DC bus voltage ($V_{bus}$) (301) exceeds the maximum operating limit ($V_{bus} > V_{busmax}$) established in normal conditions, it enables the chopper activation permission (chopper_enable=on) (303) by means of a hysteresis block (302), activation of the different operating states (304) (c1 . . . cm) of the chopper (201) according to the DC bus voltage level (Vbus) (301) and the current entering the DC bus ($I_{in.bus}$) from the generator ($I_{generator}$) or from the grid ($I_{grid}$). Operating states (304) (c1 . . . cm) are understood as the different equivalent resistance levels ($Req_1$ . . . $Req_m$) that can be achieved through the activation or deactivation (p1 . . . pn) of the different branches (1 . . . n) of the chopper (201). For example, when the number of branches is 4 (n=4), up to 16 different equivalent resistance values (m=16) can be achieved, i.e. 16 operating states (304), depending on the operating state (304) (c1 . . . cm) obtained, the necessary activations or deactivations (p1 . . . pn) of the branches (1 . . . n) of the chopper (201) are determined, if the DC bus voltage level ($V_{bus}$) (301) is below the minimum bus voltage level ($V_{bus} < V_{busmin}$), the chopper deactivation permission (201) (chopper_enable=off) (303) is enabled by means of the hysteresis block (302).

In a preferred embodiment, the determination of the activation of the chopper (201) is performed according to the level of current entering the DC bus ($I_{in.bus}$).

In the present embodiment, normal conditions must be understood as those wherein the bus voltage ($V_{bus}$) is within the range established by the minimum bus voltage ($V_{busmin}$) and the maximum bus voltage ($V_{busmax}$).

Figure 4:
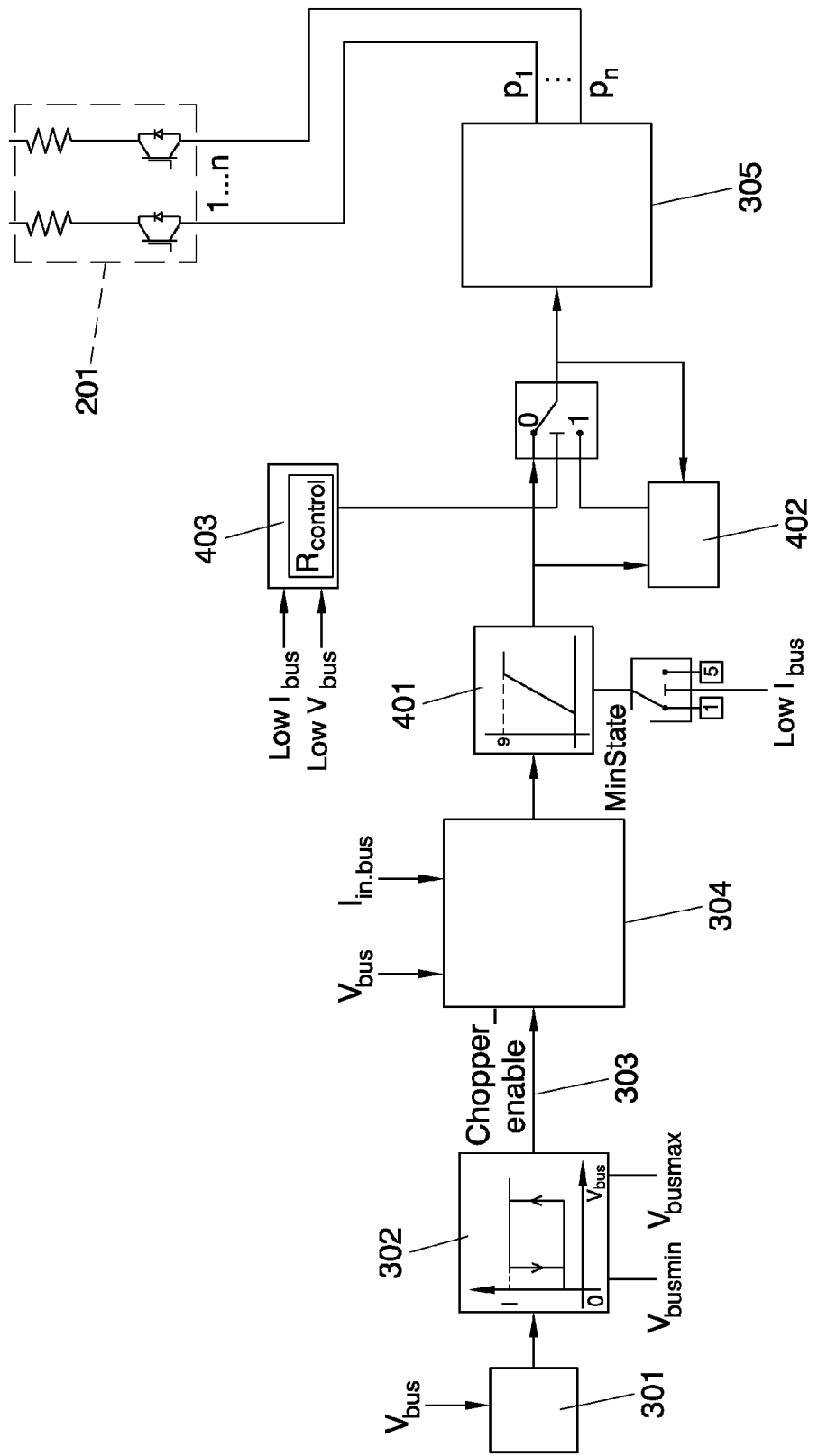
FIG. 4.—Shows the control method of a preferred embodiment of the invention applied to a chopper of "n" branches.

FIG. 4 details the control method of another preferred embodiment of the invention. If the DC bus voltage level ($V_{bus}$) (301) exceeds the maximum operating limit ($V_{bus} > V_{busmax}$) established in normal conditions, the activation permission of the chopper (chopper_enable=on) (303) is enabled by means of a hysteresis block (302). Depending on the measured level of current entering the DC bus ($I_{in.bus}$), two different control sequences are distinguished:

if the current entering the DC bus ($I_{in.bus}$) exceeds a certain percentage of the nominal current, the equivalent resistance value ($Req_1$ . . . $Req_m$) to connect is determined based on the DC bus voltage level ($V_{bus}$) (301) reached according to the operating states table (304).

if the current entering the DC bus ($I_{in.bus}$) is below a certain percentage of the nominal current, the equivalent resistance value ($Req_1$ . . . $Req_m$) to connect is determined based on the bus voltage level ($V_{bus}$) (301) reached according to the operating states table (304), but the state is limited to a minimum state (401), (in the example, to state 5). In this way, a resistor lower than a minimum resistance value (in the example, 1Ω) will not be connected, which would cause an excessive current consumption and a drop in the DC bus voltage ($V_{bus}$) (301) beneath the normal operating range.

Once the equivalent resistance value necessary to connect is determined, the activation or deactivation (p1 . . . pn) of the different branches (1 . . . n) of the chopper (201) is determined from the table (305).

With the chopper (201) connected, as the DC bus voltage ($V_{bus}$) (301) decreases, the branches (1 . . . n) of the corresponding chopper (201) are deactivated, according to the specific states in the table (305). Depending on the level of current measured entering the DC bus ($I_{in.bus}$), two different control sequences are distinguished:

if the current entering the DC bus ($I_{in.bus}$) exceeds a certain percentage of the nominal current, it is forced to go from an equivalent resistance state to the next sequentially greater state (402). This progressive resistance increase prevents a sudden break of the current from causing overvoltages that could damage the system. The disconnection permission will not be enabled, changing between non-consecutive states ($R_{control}$).

if the current entering the DC bus ($I_{in.bus}$) is below a certain percentage of the nominal current, or the DC bus voltage level ($V_{bus}$) (301) is low enough (403), the sequential disconnection process of the chopper (201) can cause the DC bus voltage ($V_{bus}$) (301) to decrease below the minimum level permitted within the operating range. In this case, the jump from one equivalent resistance to another non-consecutive resistance will be permitted. The disconnection permission will be enabled changing between non-consecutive states ($R_{control}$).

Once the DC bus voltage level ($V_{bus}$) (301) is below the minimum bus voltage level ($V_{bus} < V_{busmin}$), and all of the branches (1 ... n) of the chopper (201) have been deactivated, the deactivation permission of the chopper (201) (chopper_enable=off) (303) is enabled by means of a hysteresis block (302). In the following table 1, the different operating states (304) are shown depending on the equivalent resistance values.

TABLE 1

| State | Req (Ω) | $V_{bus}$ |
|---|---|---|
| 1 | 0.50 | 1.125 <= V |
| 2 | 0.57 | 1.08 <= V < 1.125 |
| 3 | 0.67 | 1.07 <= V < 1.08 |
| 4 | 0.80 | 1.06 <= V < 1.07 |
| 5 | 1.00 | 1.05 <= V < 1.06 |
| 6 | 1.33 | 1.04 <= V < 1.05 |
| 7 | 2.00 | 1.03 <= V < 1.04 |
| 8 | 4.00 | 1.02 <= V < 1.01 |

In the example, a chopper (201) with four branches (201) with the following resistance values R1=1Ω, R2=2Ω, R3=R4=4Ω has been considered. 8 different equivalent resistance values ($R_{eq}$) have been obtained from these resistance values:

$$Req = \frac{1}{\sum_{k=1}^{n} \frac{1}{R_k}}$$

On the other hand, in table 2 shown below, the activations and deactivations (305) of the branches (1 ... n) of a chopper (201) are shown, where 1 is activated branch and 0 is deactivated branch. In said table 2, the different states obtained for four branches (n=4) are shown, with the previously indicated resistance values. State 9 corresponds to the deactivation of all of the branches (1 ... n) of the chopper (201).

TABLE 2

| R1 (1Ω) | R2 (2Ω) | R3 (4Ω) | R4 (4Ω) | STATE |
|---|---|---|---|---|
| 1 | 1 | 1 | 1 | 1 |
| 1 | 1 | 1 | 0 | 2 |
| 1 | 1 | 0 | 1 | 2 |
| 1 | 1 | 0 | 0 | 3 |
| 1 | 0 | 1 | 1 | 3 |
| 1 | 0 | 1 | 0 | 4 |
| 1 | 0 | 0 | 1 | 4 |
| 1 | 0 | 0 | 0 | 5 |

TABLE 2-continued

| R1 (1Ω) | R2 (2Ω) | R3 (4Ω) | R4 (4Ω) | STATE |
|---|---|---|---|---|
| 0 | 1 | 1 | 1 | 5 |
| 0 | 1 | 1 | 0 | 6 |
| 0 | 1 | 0 | 1 | 6 |
| 0 | 1 | 0 | 0 | 7 |
| 0 | 0 | 1 | 1 | 7 |
| 0 | 0 | 1 | 0 | 8 |
| 0 | 0 | 0 | 1 | 8 |
| 0 | 0 | 0 | 0 | 9 |

In another preferred embodiment, in addition to the DC bus voltage level ($V_{bus}$) (301), the current entering the DC bus ($I_{in.bus}$) will also be taken into account to determine the activation of the shopper (201). In this manner, the system is equipped with a greater observability which permits the sudden variation of the DC bus voltage ($V_{bus}$) (301) to be predicted in the event of a transient in the grid or in the generator.

The invention claimed is:

1. A power converter control method associated to a generator, a power converter featuring one chopper comprising several branches (1...n) in a DC bus, the method comprising: detecting whether a DC bus voltage ($V_{bus}$) exceeds a threshold which determines an activation of the chopper, enabling chopper activation permission, activating different operating states of the chopper with different equivalent resistance levels ($Req_1$ ... $Req_m$) corresponding to the activation and a deactivation (p1... pn) of its branches (1... n), according to a DC bus voltage level ($V_{bus}$) and a current entering the DC bus ($I_{in.bus}$) from the generator or from a grid, detecting whether the DC bus voltage ($V_{bus}$) is lower than a threshold which determines a deactivation of the chopper, enabling chopper deactivation permission, deactivating the different operating states of the chopper according to the DC bus voltage ($V_{bus}$) and the current entering the DC bus ($I_{in.bus}$) from the generator or from the grid and wherein if the current entering the DC bus ($I_{in.bus}$) exceeds a certain percentage of a nominal current, an equivalent resistance value (Req1 ... $Req_m$) to connect is determined based on the DC bus voltage level ($V_{bus}$) reached.

2. The power converter control method according to claim 1, wherein the current entering the DC bus ($I_{in.bus}$) is obtained from a value selected from one of the following: a value of current measured in the generator, a value of current measured in a grid-side converter, a value of current measured in a generator-side converter, and a value of current measured in the DC bus.

3. The power converter control method according to claim 1, wherein a determination of the activation of the chopper is carried out according to a level of current entering the DC bus ($I_{in.bus}$).

4. A power converter control method associated to a generator, a power converter featuring one chopper comprising several branches (1...n) in a DC bus, the method comprising: detecting whether a DC bus voltage ($V_{bus}$) exceeds a threshold which determines a activation of the chopper, enabling chopper activation permission, activating different operating states of the chopper with different equivalent resistance levels ($Req_1$... $Req_m$) corresponding to the activation and a deactivation (p1... pn) of its branches (1... n), according to a DC bus voltage level ($V_{bus}$) and of a current entering the DC bus ($I_{in.bus}$) from the generator or from a grid, detecting whether the DC bus voltage level ($V_{bus}$) is lower than a threshold which determines a deactivation of the chopper, enabling chopper deactivation permission, deactivating the different operating states of the chopper according to the DC bus voltage level ($V_{bus}$) and of the current entering the DC bus ($I_{in.bus}$) from the generator or from the grid, and wherein if the current entering the DC bus ($I_{in.bus}$) is below a certain percentage of a nominal current, an equivalent resistance value ($Req_1 \ldots Req_m$) to connect is determined based on the bus voltage level ($Vb_{bus}$) reached and a minimum resistance value is established.

5. The power converter control method according to claim 4, wherein the current entering the DC bus ($I_{in.bus}$) is obtained from a value selected from one of the following: a value of current measured in the generator, a value of current measured in a grid-side converter, a value of current measured in a generator-side converter, and a value of current measured in the DC bus.

6. The power converter control method according to claim 4, wherein a determination of the activation of the chopper is carried out according to a level of current entering the DC bus ($I_{in.bus}$).

7. A power converter control method associated to a generator, a power converter featuring one chopper comprising several branches (1...n) in a DC bus, the method comprising: detecting whether a DC bus voltage ($V_{bus}$) exceeds a threshold which determines an activation of the chopper, enabling chopper activation permission, activating different operating states of the chopper with different equivalent resistance levels ($Req_1 \ldots Req_m$) corresponding to the activation and a deactivation (p1...pn) of its branches (1...n), according to a DC bus voltage level ($V_{bus}$) and of a current entering the DC bus ($I_{in.bus}$) from the generator or from a grid, detecting whether the DC bus voltage level ($V_{bus}$) is lower than a threshold which determines a deactivation of the chopper, enabling chopper deactivation permission, deactivating different operating states of the chopper according to the DC bus voltage level ($V_{bus}$) and of the current entering the DC bus ($I_{in.bus}$) from the generator or from the grid, and wherein if the current entering the DC bus ($I_{in.bus}$) exceeds a certain percentage of a nominal current, the chopper is forced to go from an equivalent resistance state to a next sequentially greater state.

8. The power converter control method according to claim 7, wherein the current entering the DC bus ($I_{in.bus}$) is obtained from a value selected from one of the following: a value of current measured in the generator, a value of current measured in a grid-side converter, a value of current measured in a generator-side converter, and a value of current measured in the DC bus.

9. The power converter control method according to claim 7, wherein a determination of the activation of the chopper is carried out according to a level of current entering the DC bus ($I_{in.bus}$).

10. A power converter control method associated to a generator, a power converter featuring one chopper comprising several branches (1...n) in a DC bus, the method comprising: detecting whether a DC bus voltage ($V_{bus}$) exceeds a threshold which determines an activation of the chopper, enabling chopper activation permission, activating different operating states of the chopper with different equivalent resistance levels ($Req_1 \ldots Req_m$) corresponding to the activation and a deactivation (p1...pn) of its branches (1...n), according to a DC bus voltage level ($V_{bus}$) and of a current entering the DC bus ($I_{in.bus}$) from the generator or from a grid, detecting whether the DC bus voltage level ($V_{bus}$) is lower than a threshold which determines a deactivation of the chopper, enabling chopper deactivation permission, deactivating the different operating states of the chopper according to the DC bus voltage level ($V_{bus}$) and of the current entering the DC bus ($I_{in.bus}$) from the generator or from the grid, and wherein if the current entering the DC bus ($I_{in.bus}$) is i below a certain percentage of a nominal current, or the DC bus voltage level ($V_{bus}$) is low enough, a jump from one equivalent resistance ($Req_1 \ldots Req_m$) to another nonconsecutive resistance is permitted.

11. The power converter control method according to claim 10, wherein the current entering the DC bus ($I_{in.bus}$) is obtained from a value selected from one of the following: a value of current measured in the generator, a value of current measured in a grid-side converter, a value of current measured in a generator-side converter, and a value of current measured in the DC bus.

12. The power converter control method according to claim 10, wherein a determination of the activation of the chopper is carried out according to a level of current entering the DC bus ($I_{in.bus}$).

* * * * *